US011948720B2

(12) United States Patent
Furukawa et al.

(10) Patent No.: US 11,948,720 B2
(45) Date of Patent: Apr. 2, 2024

(54) INDUCTOR

(71) Applicant: NITTO DENKO CORPORATION, Osaka (JP)

(72) Inventors: Yoshihiro Furukawa, Osaka (JP); Keisuke Okumura, Osaka (JP)

(73) Assignee: NITTO DENKO CORPORATION, Osaka (JP)

( * ) Notice: Subject to any disclaimer, the term of this patent is extended or adjusted under 35 U.S.C. 154(b) by 637 days.

(21) Appl. No.: 17/253,793

(22) PCT Filed: Jun. 4, 2019

(86) PCT No.: PCT/JP2019/022146
§ 371 (c)(1),
(2) Date: Dec. 18, 2020

(87) PCT Pub. No.: WO2019/244620
PCT Pub. Date: Dec. 26, 2019

(65) Prior Publication Data

US 2021/0265096 A1 Aug. 26, 2021

(30) Foreign Application Priority Data

Jun. 21, 2018 (JP) ................................ 2018-118144

(51) Int. Cl.
*H01F 17/00* (2006.01)
*H01F 1/12* (2006.01)
(Continued)

(52) U.S. Cl.
CPC ............ *H01F 27/255* (2013.01); *H01F 1/12* (2013.01); *H01F 17/04* (2013.01); *H01F 27/2823* (2013.01)

(58) Field of Classification Search
CPC .......... H01F 27/255; H01F 1/12; H01F 17/04; H01F 27/2823; H01F 1/26; H01F 2017/048; H01F 2017/065; H01F 17/06
See application file for complete search history.

(56) References Cited

U.S. PATENT DOCUMENTS

| | | | |
|---|---|---|---|
| 2009/0002117 | A1 | 1/2009 | Kawarai |
| 2011/0260825 | A1 | 10/2011 | Doljack et al. |

(Continued)

FOREIGN PATENT DOCUMENTS

| | | | |
|---|---|---|---|
| CN | 104036917 | A | 9/2014 |
| CN | 105247632 | A | 1/2016 |

(Continued)

OTHER PUBLICATIONS

International Preliminary Report on Patentability issued by WIPO dated Dec. 22, 2020, in connection with International Patent Application No. PCT/JP2019/022146.

(Continued)

*Primary Examiner* — Tuyen T Nguyen
(74) *Attorney, Agent, or Firm* — Edwards Neils LLC; Jean C. Edwards, Esq.

(57) ABSTRACT

An inductor includes a wire having a generally circular shape in cross section, and the magnetic layer covering the wire, wherein the wire includes a conductive wire and an insulating layer covering the conductive wire, the magnetic layer contains anisotropic magnetic particles and a binder, and includes in a surrounding region of the wire within 1.5 times the radius of the wire, a first region in which the anisotropic magnetic particles are oriented along the circumferential direction of the wire, and a second region in which the anisotropic magnetic particles are oriented along (Continued)

1 the crossing direction that crosses the circumferential direction, or in which the anisotropic magnetic particles are not oriented.

5 Claims, 13 Drawing Sheets

(51) Int. Cl.

| | |
|---|---|
| ***H01F 17/04*** | (2006.01) |
| ***H01F 27/255*** | (2006.01) |
| ***H01F 27/28*** | (2006.01) |

(56) References Cited

U.S. PATENT DOCUMENTS

| | | | |
|---|---|---|---|
| 2014/0253276 A1 | 9/2014 | Iwasaki et al. | |
| 2015/0228390 A1 | 8/2015 | Bjarnasen et al. | |
| 2015/0325362 A1 | 11/2015 | Kumura et al. | |
| 2016/0172086 A1 | 6/2016 | Habu et al. | |
| 2016/0247612 A1 | 8/2016 | Ebe et al. | |
| 2017/0004915 A1* | 1/2017 | Park | H01F 27/255 |
| 2017/0169932 A1 | 6/2017 | Lambert et al. | |

FOREIGN PATENT DOCUMENTS

| | | | |
|---|---|---|---|
| EP | 2 963 094 A1 | 1/2016 | |
| JP | H10-074626 A | 3/1998 | |
| JP | H10-144526 A | 5/1998 | |
| JP | 2009-009985 A | 1/2009 | |
| JP | 2014-071969 A | 4/2014 | |
| JP | 2014-165363 A | 9/2014 | |
| JP | 2015-092544 A | 5/2015 | |
| JP | 2016-046090 A | 4/2016 | |
| JP | 2017-037888 A | 2/2017 | |
| KR | 10-2018-0024045 A | 3/2018 | |
| TW | 201203293 A1 | 1/2012 | |
| TW | 201435935 A | 9/2014 | |

OTHER PUBLICATIONS

International Search Report Issued in PCT/JP2019/022146 dated Aug. 20, 2019.

Written Opinion Issued in PCT/JP2019/022146 dated Aug. 20, 2019.

Office Action, issued by the State Intellectual Property Office of China dated May 10, 2022, in connection with Chinese Patent Application No. 201980041525.0.

* cited by examiner

INDUCTOR

CROSS-REFERENCE TO RELATED APPLICATIONS

The present application is a 35 U.S.C. 371 National Stage Entry PCT/JP2019/022146, filed on Jun. 4, 2019, which claims priority from Japanese Patent Application No. 2018-118144, filed on Jun. 21, 2018, the contents of all of which are herein incorporated by reference in their entirety.

TECHNICAL FIELD

The present invention relates to an inductor.

BACKGROUND ART

It has been known that an inductor is mounted on an electronic device to be used as a passive element such as a voltage conversion member.

For example, Patent Document 1 has proposed an inductor including a cuboid chip main portion composed of a magnetic material, and an internal conductor such as copper embedded in the chip main portion, wherein the cross sectional shape of the chip main portion is similar to the cross sectional shape of the internal conductor (ref: Patent Document 1). That is, in the inductor of Patent Document 1, the magnetic material covers the surrounding of the wire (internal conductor) having a rectangular (cuboid) shape in cross section.

CITATION LIST

Patent Document

Patent Document 1: Japanese Unexamined Patent Publication No. H10-144526

SUMMARY OF THE INVENTION

Problem to be Solved by the Invention

Meanwhile, it has been examined to improve inductance of the inductor by using anisotropic magnetic particles such as flat magnetic particles as the magnetic material, allowing the anisotropic magnetic particles to be oriented surrounding the wire.

However, with the inductor of Patent Document 1, the wire has a rectangular shape in its cross section, and therefore there are disadvantages in that the presence of a corner portion may make it difficult to allow the anisotropic magnetic particles to be oriented surrounding the wire. Therefore, improvement in inductance may be insufficient.

Thus, it has been further examined that a wire having a circular shape in cross section is used, and allows the anisotropic magnetic particles to be oriented surrounding the wire.

However, in this method, inductance may improve, but the superimposed DC current characteristics are insufficient, and further improvement are demanded.

The present invention provides an inductor with excellent inductance and superimposed DC current characteristics.

Means for Solving the Problem

The present invention [1] includes an inductor including a wire having a generally circular shape in cross section, and the magnetic layer covering the wire, wherein the wire includes a conductive wire and an insulating layer covering the conductive wire, the magnetic layer contains anisotropic magnetic particles and a binder, and includes in a surrounding region of the wire within 1.5 times the radius of the wire, a first region in which the anisotropic magnetic particles are oriented along the circumferential direction of the wire, and a second region in which the anisotropic magnetic particles are oriented along the crossing direction that crosses the circumferential direction, or in which the anisotropic magnetic particles are not oriented.

The present invention [2] includes the inductor described in [1], including a plurality of the second regions.

The present invention [3] includes the inductor described in [1] or [2], wherein the second region is a region in which the anisotropic magnetic particles are oriented along the diameter direction of the wire.

The present invention [4] includes the inductor described in [3], wherein in the second region, the filling rate of the anisotropic magnetic particles is 40 volume % or more.

The present invention [5] includes the inductor described in any one of [1] to [4], wherein the magnetic layer includes a third region, in which the anisotropic magnetic particles are oriented along the diameter direction of the wire in an outside of the surrounding region.

Effects of the Invention

The inductor of the present invention includes a wire, a magnetic layer covering the wire, wherein in the surrounding region of the wire, the first region in which the anisotropic magnetic particles are oriented along the circumferential direction of the wire is included, and therefore it has excellent inductance. Furthermore, in the second region other than the first region, the anisotropic magnetic particles are oriented along the crossing direction, or the anisotropic magnetic particles are not oriented, and therefore superimposed DC current characteristics are excellent.

DESCRIPTION OF THE EMBODIMENTS

Figure 2:
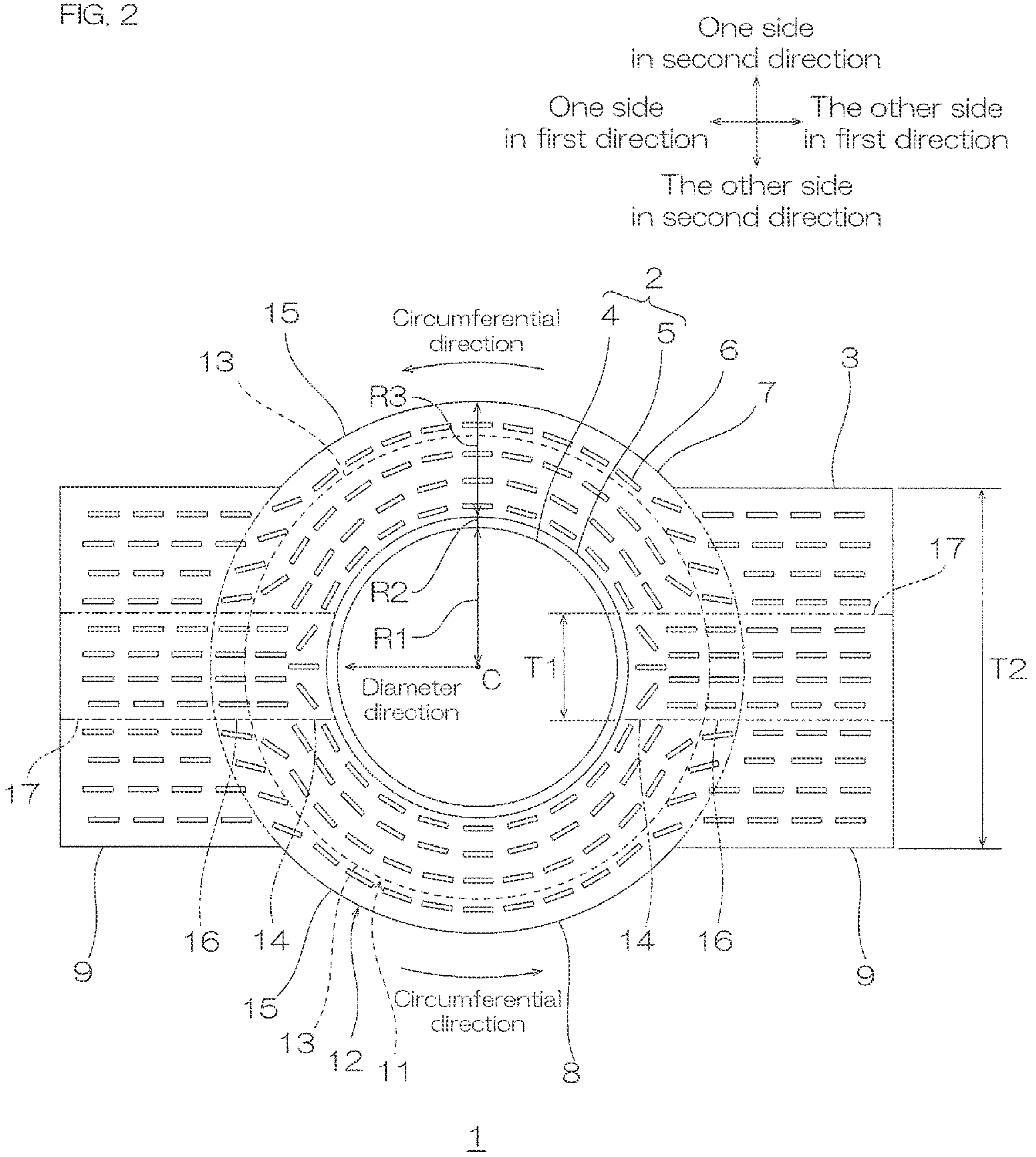
FIG. 2 shows a cross sectional view in a direction orthogonal to the axis direction of FIG. 1.

In FIG. 2, left-right direction on the sheet is the first direction, the left side on the sheet is one side in the first direction, and the right side on the sheet is the other side in the first direction. The up-down direction on the sheet is the second direction (direction orthogonal to first direction), upper side on the sheet is one side in the second direction, and lower side on the sheet is the other side in second direction. The paper thickness direction on the sheet is third direction (direction orthogonal to first direction and second direction, axis direction), near side on the sheet is one side in third direction, far side on the sheet is the other side in third direction. To be specific, the directions are in accordance with the direction arrows in figures.

First Embodiment

The inductor of the present invention in a first embodiment is described with reference to FIG. 1 to FIG. 2.

Figure 1:
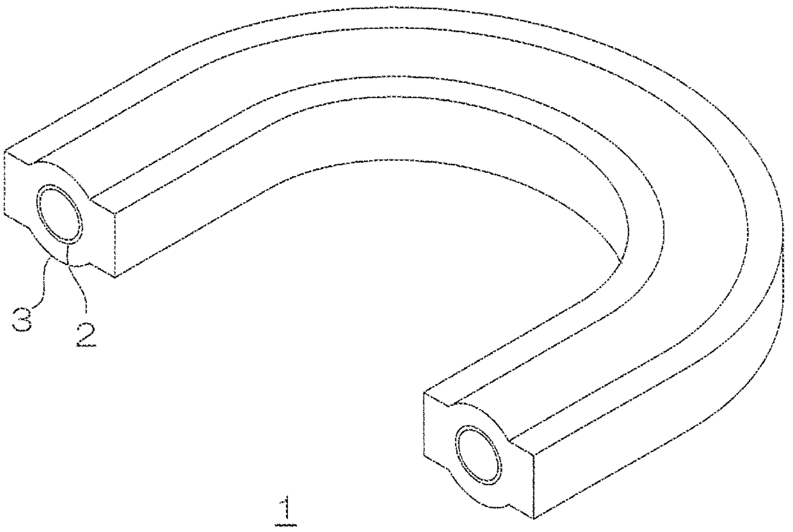
FIG. 1 shows a perspective view of the inductor of the present invention in a first embodiment.

As shown in FIG. 1, the inductor 1 extends along the axis direction, and for example, has a substantially loop shape in plan view. The inductor 1 includes a wire 2 and a magnetic layer 3.

As shown in FIGS. 1 and 2, the wire 2 extends and elongated along the axis direction, and has a generally circular shape in cross section. The wire 2 is an electrical wire covered with an insulating layer, and to be specific, the wire 2 includes a conductive wire 4 and an insulating layer 5 covering the conductive wire 4.

As shown in FIG. 2, the conductive wire 4 has a generally circular shape in cross section.

Materials of the conductive wire 4 are, for example, a metal conductor such as copper, silver, gold, aluminum, nickel, and alloys thereof, and preferably, copper is used. The conductive wire 4 can be a single layer structure, or a multiple layer structure in which the surface of the core conductor (for example, copper) is plated (for example, nickel).

The conductive wire 4 has a radius $R_1$ of, for example, 25 μm or more, preferably 50 μm or more, and for example, 2000 μm or less, preferably 200 μm or less.

The insulating layer 5 is a layer that protects the conductive wire 4 from chemicals or water, and prevents short circuit of the conductive wire 4. It is disposed so as to cover the entire external peripheries of the wire 2.

The insulating layer 5 has a substantially circular ring shape in cross section sharing the center axis line with the wire 2.

For the materials of the insulating layer 5, for example, insulating resin such as polyvinyl formal, polyester, polyester imide, polyamide, polyimide, and polyamide-imide are used.

These can be used singly, or can be used in combination of two or more.

The insulating layer 5 can be made of a single layer, or can be made of a plurality of layers.

The thickness $R_2$ of the insulating layer 5 is substantially homogenous at any point in circumferential direction of the wire 2 in diameter direction (an example of a crossing direction crossing the circumferential direction), and for example, the thickness $R_2$ of the insulating layer 5 is 1 μm or more, preferably 3 μm or more, and for example, 100 μm or less, preferably 50 μm or less.

The ratio of the radius $R_1$ of the conductive wire 4 relative to the thickness $R_2$ of the insulating layer 5 ($R_1/R_2$) is, for example, 1 or more, preferably 10 or more, and for example, 200 or less, preferably 100 or less.

The radius ($R_1+R_2$) of the wire 2 is, for example, 25 μm or more, preferably 50 μm or more, and for example, 2000 μm or less, preferably 200 μm or less.

The magnetic layer 3 is a layer for improving inductance.

The magnetic layer 3 is disposed so as to cover the entire outer circumference of the wire 2.

The magnetic layer 3 is formed from a magnetic composition containing anisotropic magnetic particles 6 and a binder 7.

Examples of the materials forming the anisotropic magnetic particles 6 include a soft magnetic material and hard magnetic material. Preferably, in view of inductance, soft magnetic material is used.

Examples of the soft magnetic material include magnetic stainless steel (Fe—Cr—Al—Si alloy), Sendust (Fe—Si—Al alloy), Permalloy (Fe—Ni alloy), silicon copper (Fe—Cu—Si alloy), Fe—Si alloy, Fe—Si—B (—Cu—Nb) alloy, Fe—Si—Cr—Ni alloy, Fe—Si—Cr alloy, Fe—Si—Al—Ni—Cr alloy, and ferrite. Of these examples of the soft magnetic materials, in view of magnetic characteristics, preferably, Sendust (Fe—Si—Al alloy) is used.

The anisotropic magnetic particles 6 can have a shape of, in view of anisotropy, for example, flat (plate) or acicular, and preferably, in view of excellent relative permeability in surface direction (two dimensional), flat shape is used.

Examples of the binder 7 include binder resin. Examples of the binder resin include thermosetting resin and thermoplastic resin.

Examples of the thermosetting resin include epoxy resin, phenol resin, melamine resin, thermosetting polyimide resin, unsaturated polyester resin, polyurethane resin, and silicone resin. In view of adhesiveness and heat resistance, preferably, epoxy resin, or phenol resin is used.

Examples of the thermoplastic resin include acrylic resin, ethylene-vinyl acetate copolymer, polycarbonate resin, polyamide resin (6-nylon, 6,6-nylon, etc.), thermoplastic polyimide resin, and saturated polyester resin (PET, PBT, etc.). Preferably, acrylic resin is used.

For the resin, preferably, thermosetting resin and thermoplastic resin are used in combination. More preferably, acrylic resin, epoxy resin, and phenol resin are used in combination. In this manner, the anisotropic magnetic particles 6 can be fixed reliably around the wire 2 with a predetermined orientation state and a highly filled state.

The magnetic composition can contain, as necessary, additives such as a thermosetting curing catalyst, inorganic particles, organic particles, and cross-linking agent.

In the magnetic layer 3, the anisotropic magnetic particles 6 are oriented and disposed homogenously in the binder 7.

The magnetic layer 3 integrally includes one main portion 8, and a plurality of (two) side portions 9 in cross section.

The main portion 8 has a substantially circular ring shape in cross section sharing the center axis line with the wire 2.

The main portion 8 integrally has a surrounding region 11 defined inside, and an outer circumferential region 12 defined outside.

The surrounding region 11 has a substantially circular ring shape in cross section. The surrounding region 11 is a region positioned in the main portion 8 from the center point C of the wire 2 within the range of 1.5 times the radius $R_1+R_2$ of the wire 2. That is, the surrounding region 11 is a region positioned in the range from the inner peripheral edge of the surrounding region 11 to 0.5 times the radius $R_1+R_2$ outside of the diameter direction.

The surrounding region 11 continuously has a plurality of (two) inner circumferentially oriented regions 13 (an example of first region) and a plurality of (two) inner diameter direction oriented regions 14 (an example of second region).

In the inner circumferentially oriented region 13, the anisotropic magnetic particles 6 are oriented along the circumferential direction in cross section. That is, the direction (for example, with flat anisotropic magnetic particles, surface direction of particles) with high relative permeability of the anisotropic magnetic particles 6 approximately coincides with the tangent of the circle with the center point C as the center of the wire 2. To be more specific, the particles 6 oriented in circumferential direction is defined as follows: the angle formed by the surface direction of the particles 6 and the tangent of circle where the particle 6 is positioned is 15 degrees or less.

In the inner circumferentially oriented region 13, more than 50%, preferably 70% or more of the anisotropic magnetic particles 6 is oriented in the circumferential direction relative to the entire anisotropic magnetic particles 6 contained in the region 13. That is, in the inner circumferentially oriented region 13, less than 50%, preferably 30% or less of the non-oriented anisotropic magnetic particles 6 may be included.

The plurality of inner circumferentially oriented regions 13 are disposed to face each other in the second direction in spaced apart relation with the wire 2 sandwiched therebetween.

The ratio of the area of the plurality of inner circumferentially oriented regions 13 relative to the entire surrounding region 11 is 50% or more, preferably 60% or more, and for example, 90% or less, preferably 80% or less.

In the inner circumferentially oriented region 13, the filling rate of the anisotropic magnetic particles 6 is, for example, 40 volume % or more, preferably 45 volume % or more, and for example, 90% by volume or less, preferably 70% by volume or less. When the filling rate is the above-described lower limit or more, it has excellent inductance.

The filling rate can be calculated by measurement of actual specific gravity, or binarization of the SEM cross sectional image.

In the inner circumferentially oriented region 13, the relative permeability in the circumferential direction is, for example, 5 or more, preferably 10 or more, more preferably 30 or more, and for example, 500 or less.

The relative permeability in the diameter direction is, for example, 1 or more, preferably 5 or more, and for example, 100 or less, preferably 50 or less, more preferably 25 or less. The ratio (circumferential direction/diameter direction) of the relative permeability of circumferential direction relative to the diameter direction is, for example, 2 or more, preferably 5 or more, and for example, 50 or less. When the relative permeability is in the above-described range, it has excellent inductance.

The relative permeability can be measured by, for example, an impedance analyzer (manufactured by Agilent Technologies [4291B]) using a magnetic material test fixture.

In the inner diameter direction oriented region 14, the anisotropic magnetic particles 6 are oriented along the diameter direction (in FIG. 2, first direction) in cross section. That is, the direction (for example, with flat anisotropic magnetic particles, surface direction of particles) with high relative permeability of the anisotropic magnetic particles 6 approximately coincide with the diameter direction. To be more specific, the particles 6 oriented in the diameter direction is defined as follows: the angle formed by the surface direction of the particles 6 and the diameter direction where the particles 6 are positioned is 15 degrees or less.

In the inner diameter direction oriented region 14, more than 50%, preferably 70% or more of the anisotropic magnetic particles 6 are oriented in diameter direction relative to the entire anisotropic magnetic particles 6 included in the region 14. That is, in the inner diameter direction oriented region 14, less than 50%, preferably 30% or less of the anisotropic magnetic particles 6 can be non-oriented.

The plurality of inner diameter direction oriented regions 14 are disposed to face each other at one side in the first direction of the wire 2 and at the other side in the first direction of the wire 2 with the wire sandwiched therebetween. To be specific, the center point C of the wire 2 is positioned between the inner diameter direction oriented region 14 of one side and inner diameter direction oriented region 14 of the other side.

The plurality of the inner circumferentially oriented regions 13 and the plurality of the inner diameter direction oriented regions 14 are disposed alternately in the circumferential direction, and to be specific, the two inner diameter direction oriented regions 14 facing each other in diameter direction is sandwiched between the two inner circumferentially oriented regions 13 having an arc shape.

The area ratio of the plurality of inner diameter direction oriented regions 14 relative to the entire surrounding region 11 is 10% or more, preferably 20% or more, and for example, 50% or less, preferably 40% or less.

In the inner diameter direction oriented region 14, the filling rate of the anisotropic magnetic particles 6 is, for example, 40 volume % or more, preferably 50 volume % or more, and for example, 90% by volume or less, preferably 70% by volume or less. When the filling rate is within the above-described range, it has excellent inductance.

In the inner diameter direction oriented region 14, the relative permeability in the diameter direction is, for example, 5 or more, preferably 10 or more, more preferably 30 or more, and for example, 500 or less. The relative permeability in the circumferential direction (in FIG. 2, second direction) is, for example, 1 or more, preferably 5 or more, and for example, 100 or less, preferably 50 or less, more preferably 25 or less. The ratio of relative permeability in the diameter direction relative to the circumferential direction (diameter direction/circumferential direction) is, for example, 2 or more, preferably 5 or more, and for example, 50 or less. When the relative permeability is in the above-described range, it has excellent inductance.

In the surrounding region 11, the inner region (furthest inner side region) is filled with the anisotropic magnetic particles 6 by a filling rate of, for example, 40 volume % or more, preferably 50 volume % or more, and for example, 90% by volume or less, preferably 70% by volume or less. When the filling rate is within the above-described range, it has excellent inductance.

The innermost region is a region positioned in the range from the center point C of the wire 2 to within 1.25 times the radius $R_1+R_2$ of the wire 2 in the main portion 8.

The outer circumferential region 12 has a substantially circular ring shape in cross section. The outer circumferential region 12 is a region positioned outside the surrounding region 11 in the main portion 8. The inner peripheral edge of the outer circumferential region 12 is integrally continuous with the outer peripheral edge of the surrounding region 11.

The outer circumferential region 12 has a plurality of (two) outer circumferentially oriented regions 15 and a plurality of (two) outer diameter direction oriented regions 16.

The plurality of outer circumferentially oriented regions 15 are positioned outside of the plurality of inner circumferentially oriented region 13 in the diameter direction in correspondence with the plurality of inner circumferentially oriented regions 13. The plurality of outer circumferentially oriented regions 15 are configured as the same as that of the inner circumferentially oriented region 13, and the anisotropic magnetic particles 6 are oriented in the circumferential direction.

A plurality of outer diameter direction oriented regions 16 are positioned outside a plurality of inner diameter direction oriented region 14 in the diameter direction in correspondence with a plurality of inner diameter direction oriented regions 14. The plurality of outer diameter direction oriented regions 16 are configured to be the same as that of the inner diameter direction oriented region 14, and the anisotropic magnetic particles 6 are oriented in diameter direction.

The thickness $R_3$ of the main portion 8 is 0.3 times or more of the radius $R_1+R_2$ of the wire 2, preferably 0.5 times or more, and for example, 5.0 times or less, preferably 3.0 times or less. To be specific, for example, 50 μm or more, preferably 80 μm or more, and for example, 500 μm or less, preferably 200 μm or less.

A plurality of side portions 9 are disposed both outside of the main portion 8 so as to extend in the first direction (diameter direction). A plurality of side portions 9 are disposed in spaced apart relation to face each other so as to sandwich the main portion 8 at one side in the first direction of the main portion 8 and the other side in the first direction of the main portion 8.

One side and the other side in the second direction of the plurality of side portions 9 are formed to be flat.

The plurality of side portions 9 each has a side portion oriented region 17 (an example of third region).

The side portion oriented region 17 is disposed at an intermediate portion in the second direction of the side portion 9. The side portion oriented region 17 is disposed outside in the diameter direction of the diameter direction oriented region (inner diameter direction oriented region 14 and outer diameter direction oriented region 16).

In the side portion oriented region 17, the anisotropic magnetic particles 6 are oriented along the diameter direction (in FIG. 2, first direction). That is, the direction with high relative permeability of the anisotropic magnetic particles 6 (for example, with flat anisotropic magnetic particles, surface direction of particles) coincides with the diameter direction. To be more specific, the angle formed by the surface direction and the diameter direction of the particles 6 is 15 degrees or less.

In the side portion oriented region 17, the ratio of the number of the anisotropic magnetic particles 6 oriented in diameter direction relative to the total of the anisotropic magnetic particles 6 contained in the region 17 is more than 50%, and preferably 60% or more.

In the region other than the side portion oriented region 17 in the side portion 9, the anisotropic magnetic particles 6 are oriented along the orientation direction (first direction, direction parallel diameter direction) of the side portion oriented region 17.

That is, in the entire region of the side portion 9, the anisotropic magnetic particles 6 are oriented along the first direction.

In the side portion 9, the filling rate of the anisotropic magnetic particles 6 is, for example, 40 volume % or more, preferably 50 volume % or more, and for example, 90% by volume or less, preferably 70% by volume or less. When the filling rate is in the above-described lower limit or more, it has excellent inductance.

In the side portion 9, the relative permeability in the diameter direction is, for example, 5 or more, preferably 10 or more, more preferably 30 or more, and for example, 500 or less. The relative permeability of the circumferential direction (in FIG. 2, second direction) is, for example, 1 or more, preferably 5 or more, and for example, 100 or less, preferably 50 or less, more preferably 25 or less. The ratio of the relative permeability in the diameter direction relative to the circumferential direction (diameter direction/circumferential direction) is, for example, 2 or more, preferably 5 or more, and for example, 50 or less. When the relative permeability is in the above-described range, it has excellent inductance.

The first direction length W (first direction distance from the outermost side in the first direction of the main portion 8 to the outer end edge of the side portion 9) of the side portion 9 is, for example, 10 μm or more, preferably 80 μm or more, and for example, 1000 μm or less, preferably 500 μm or less.

The second direction length (thickness) $T_2$ of the side portion 9 is, for example, 100 μm or more, preferably 200 μm or more, and for example, 2000 μm or less, preferably 1000 μm or less.

Figure 3A:
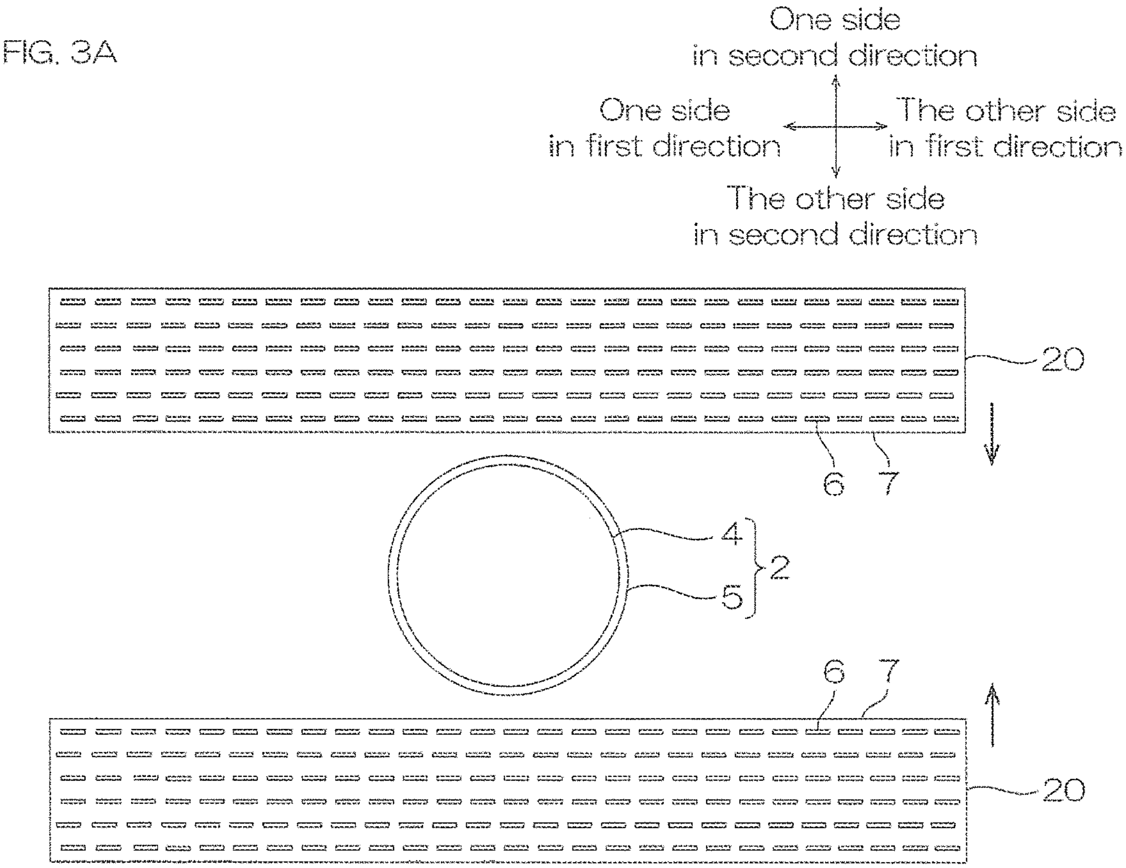
FIGS. 3A and 3B show a production process of the inductor shown in FIG. 1, FIG. 3A illustrating a step of disposing a magnetic sheet and a wire to face each other, and FIG. 3B illustrating a step of laminating the magnetic sheet on the wire.
Figure 3B:
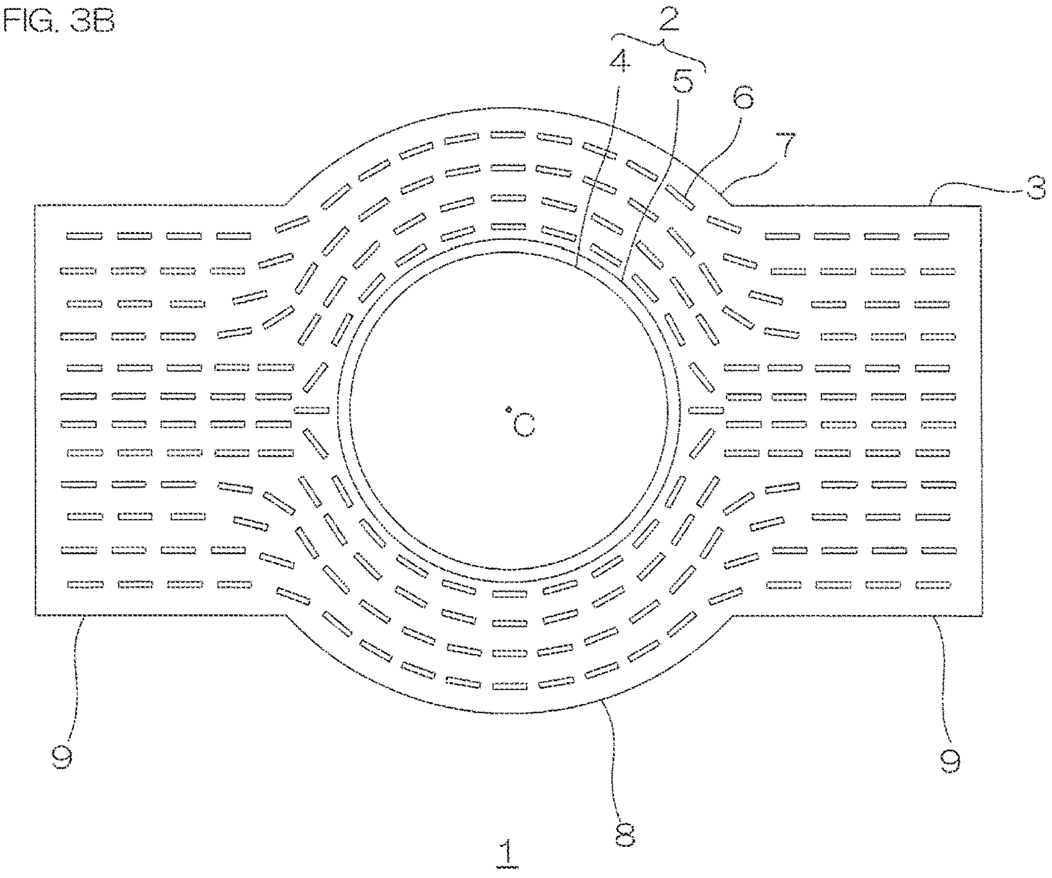

Then, with reference to FIG. 3A-B, a method for producing an inductor 1 in one embodiment is described. The method for producing an inductor 1 includes, for example, a preparation step, in which a wire 2, and two anisotropic magnetic sheets 20 are prepared, and a lamination step, in which the two anisotropic magnetic sheets 20 are laminated so as to embed the wire 2.

In the preparation step, for the wire 2, for example, a known product or a commercially available one as an enameled wire can be used.

The anisotropic magnetic sheet 20 is a sheet extending in surface direction, and formed from a magnetic composition. In the anisotropic magnetic sheet 20, the anisotropic magnetic particles 6 are oriented in the surface direction. Preferably, the anisotropic magnetic sheet 20 is in semi-cured state (B-stage).

For such an anisotropic magnetic sheet 20, a soft magnetic thermosetting adhesive film and soft magnetic film described in Japanese Unexamined Patent Publication No. 2014-165363 and Japanese Unexamined Patent Publication No. 2015-92544 are used.

In the lamination step, first, as shown in FIG. 3A, the wire 2 is disposed between the two anisotropic magnetic sheets 20. To be specific, the two anisotropic magnetic sheets 20 and the wire 2 are disposed to face each other so that the two anisotropic magnetic sheets 20 are positioned at one side and the other side in the second direction of the wire 2.

Then, as shown in FIG. 3B, the two anisotropic magnetic sheets 20 are laminated in close proximity so as to embed the wire 2. To be specific, the anisotropic magnetic sheet 20 at the one side in the second direction is pressed against the other side in the second direction, and the anisotropic magnetic sheet 20 at the other side in the second direction is pressed against the one side in the second direction.

At this time, when the anisotropic magnetic sheet 20 is in semi-cured state, it is heated. In this manner, the anisotropic magnetic sheet 20 is in a cured state (C-stage). The interface between the two anisotropic magnetic sheets 20 disappears, and the two anisotropic magnetic sheets 20 form one magnetic layer 3.

Figure 4:
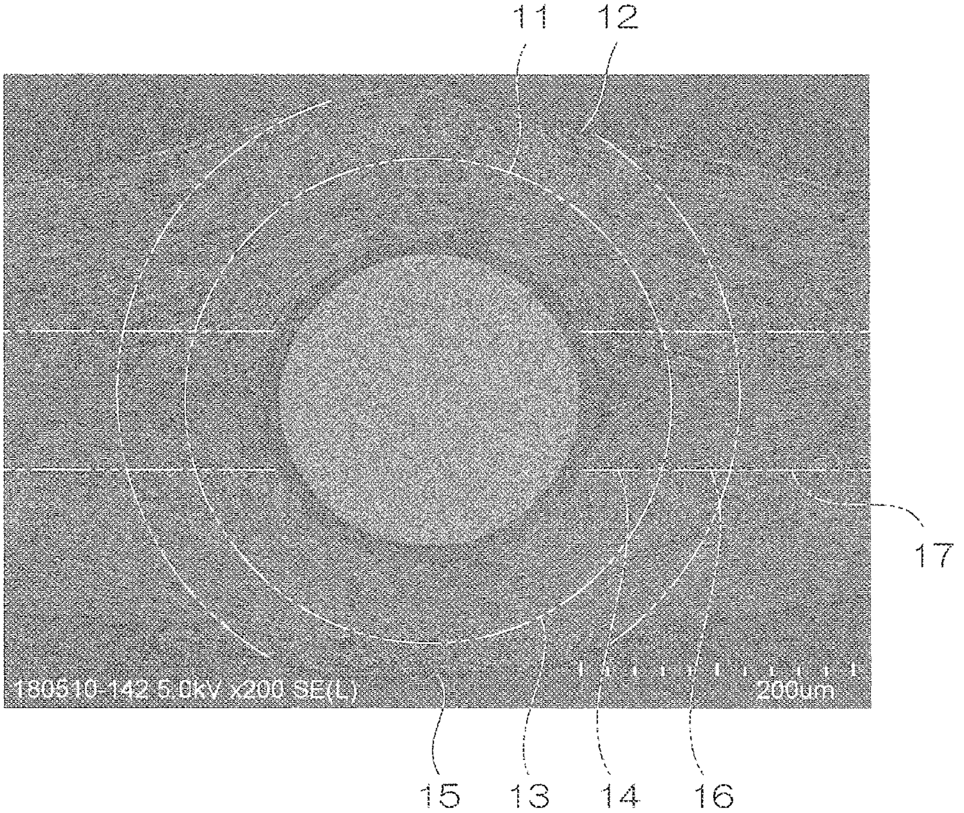
FIG. 4 shows an actual SEM image of a cross sectional view of the inductor shown in FIG. 1.

As shown in FIG. 2, in this manner, the inductor 1 including the wire 2 having a generally circular shape in cross section and a magnetic layer 3 covering the wire is obtained. That is, the inductor 1 is composed of a plurality of (two) anisotropic magnetic sheets 20 laminated so as to sandwich the wires 2. A cross sectional view (SEM image) of an actual inductor is shown in FIG. 4.

The inductor 1 has a circumferentially oriented regions (inner circumferentially oriented region 13 and outer circumferentially oriented region 15) and diameter direction oriented region (inner diameter direction oriented region 14 and diameter direction oriented region 16) in the main portion 8 of the magnetic layer 3, and has a diameter direction oriented region in the side portion 9 of the magnetic layer 3. In the main portion 8, at around the boundary of the circumferentially oriented regions and diameter direction oriented regions, the angle of orientation of the anisotropic magnetic particles 6 is gradually inclined from the circumferential direction to the diameter direction (or from circumferential direction to diameter direction).

The inductor 1 is a component for an electronic device. That is, it is a component for producing an electronic device, does not include an electron device/electronic element (chip, capacitor, etc.) or a board for mounting an electron device/electronic element, is distributed as a single component, and is an industrially applicable device.

The inductor 1 is mounted, for example, on an electronic device (incorporated). Although not shown, the electronic device includes a mount board and an electron device/electronic element (chip, capacitor, etc.) mounted on the mount board. The inductor 1 is mounted on a mount board with a connecting member such as solder, is electrically connected with other electronic device, and works as a passive element such as a coil.

The inductor 1 includes a wire 2 having a substantially circular shape, and a magnetic layer 3 covering the wire 2, and the magnetic layer 3 contains the anisotropic magnetic particles 6 and a binder 7. The surrounding region 11 of the magnetic layer 3 has an inner circumferentially oriented region 13 in which the anisotropic magnetic particles 6 are oriented along the circumferential direction of the wire 2. Therefore, inductance is improved.

In the surrounding region 11, an inner diameter direction oriented region 14 is present in which the anisotropic magnetic particles 6 are oriented along the diameter direction. Therefore, superimposed DC current characteristics are improved.

Modified Example

With reference to FIG. 5 to FIG. 8, a modified example of the embodiment shown in FIG. 1 to FIG. 2 is described. In the modified example, those members that are the same as those in the above-described embodiment are given the same reference numerals and descriptions thereof are omitted. The modified examples also have the same operations and effects as in the above-described embodiment.

Figure 5:
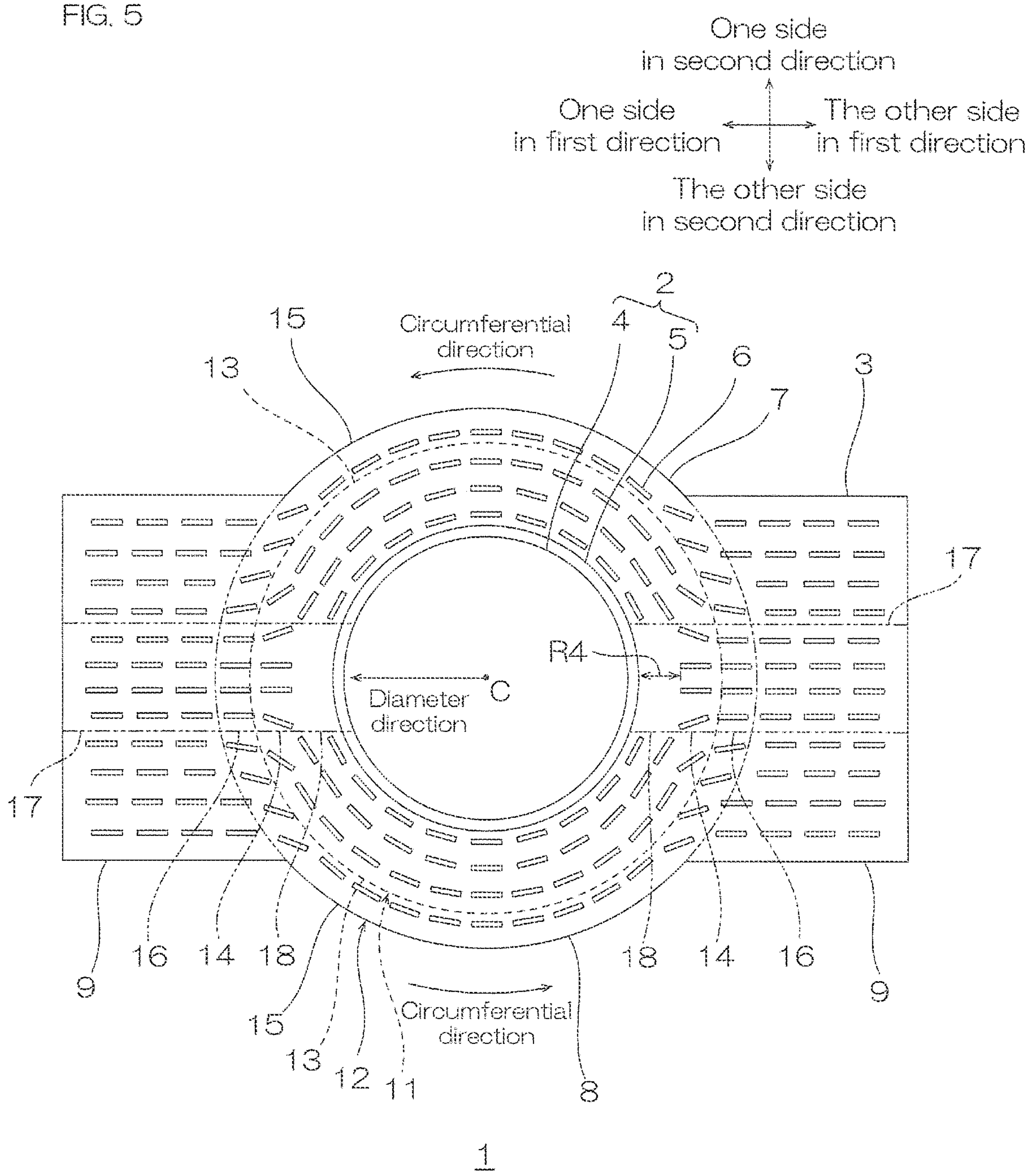
FIG. 5 shows a cross-sectional view of the inductor shown in FIG. 1 in a modified example (embodiment in which the particles are not charged in a portion of the inner diameter direction oriented region).

Although in the embodiment shown in FIG. 2, the anisotropic magnetic particles 6 are disposed homogenously in the magnetic layer 3, but for example, as shown in FIG. 5, the inner diameter direction oriented region 14 may not be filled with the anisotropic magnetic particles 6 partly.

That is, the inner diameter direction oriented region 14 may have a non-filled region 18 not filled with the anisotropic magnetic particles 6.

The non-charged region 18 has a rate of a diameter direction length $R_4$ of, for example, 90% or less, preferably 50% or less, relative to the diameter direction length of the inner diameter direction oriented region 14. To be specific, it is for example, 80 μm or less, preferably 50μ m or less, and for example, more than 0 m.

In this case, the inner diameter direction oriented region 14 is filled at a rate of, for example, 5 volume % or more, preferably 10 volume % or more, and for example, 70% by volume or less, preferably 60% by volume or less.

Preferably, in view of inductance, the embodiment shown in FIG. 2 is used.

The embodiment shown in FIG. 5 can be produced, for example, by changing the pressure application conditions for the anisotropic magnetic sheet 20 (temperature, pressure, etc.) suitably in the lamination step.

Figure 6:
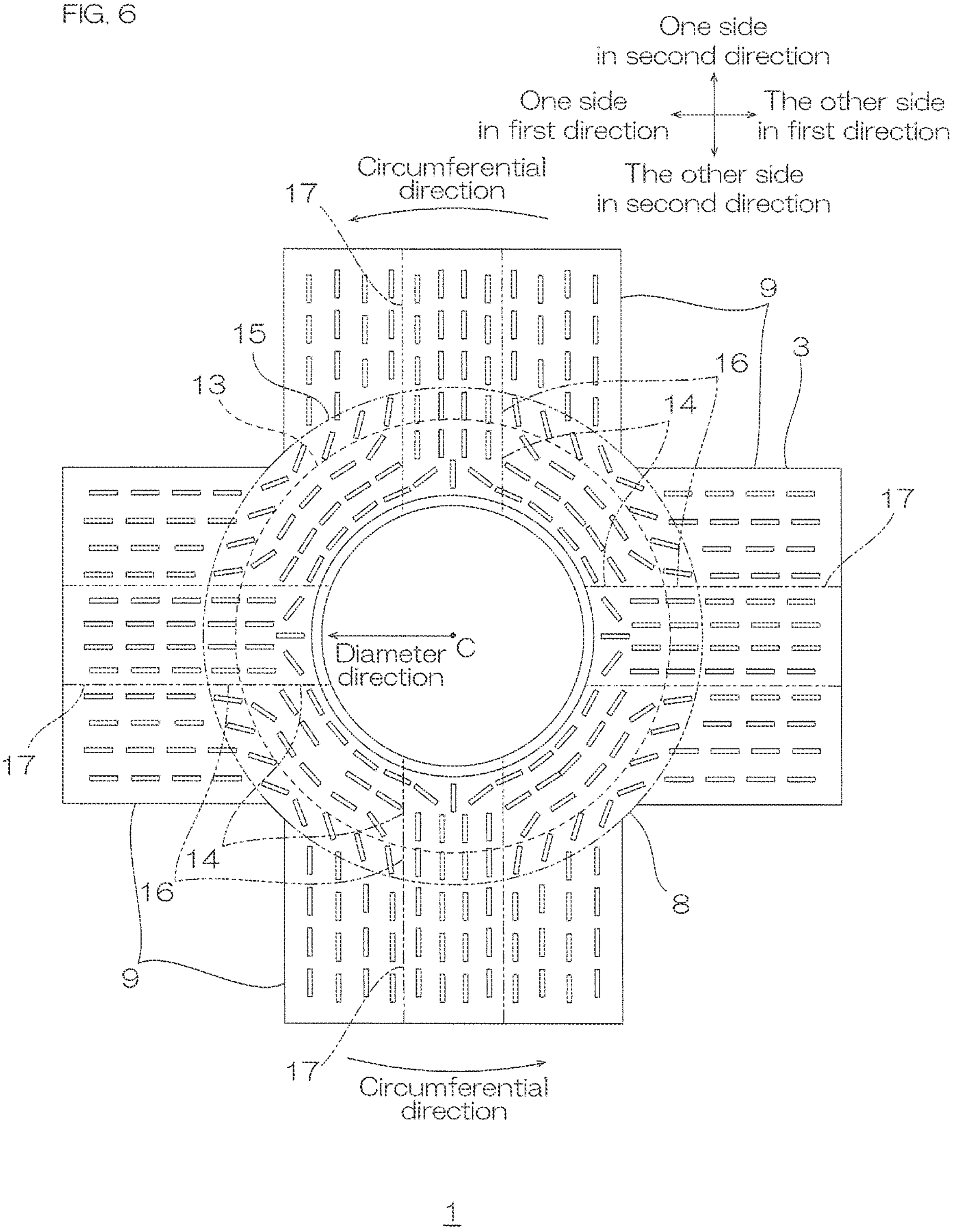
FIG. 6 shows a cross-sectional view of the inductor shown in FIG. 1 in a modified example (embodiment in which four inner diameter direction oriented regions are included).
Figure 7:
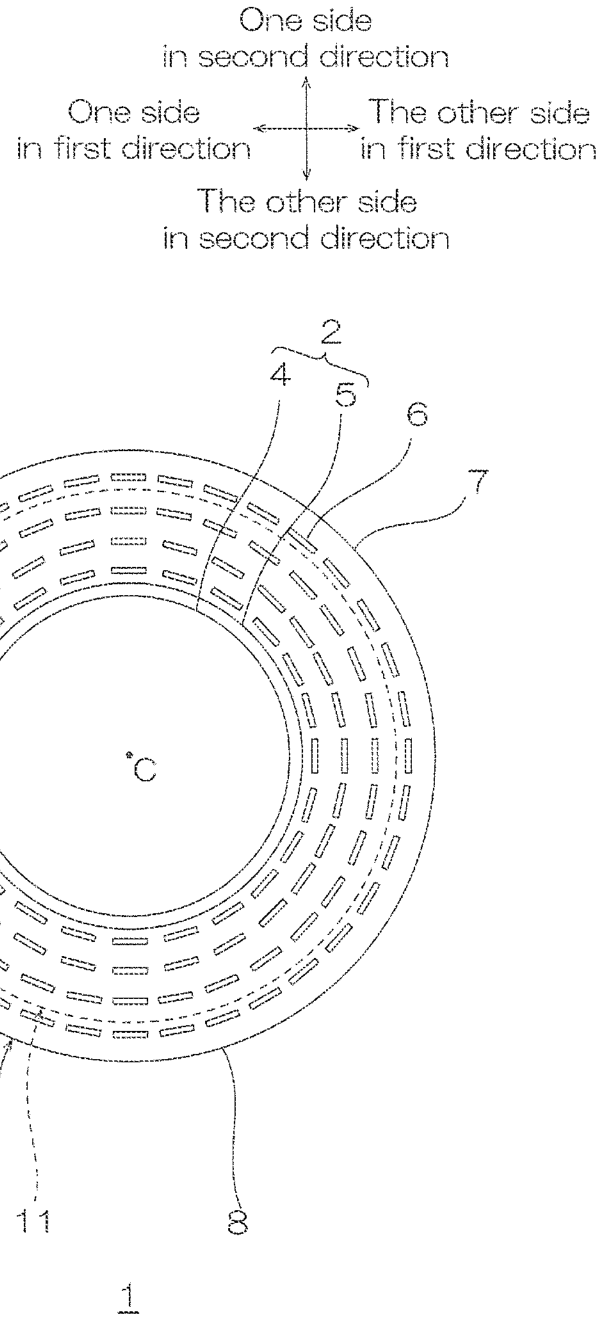
FIG. 7 shows a cross-sectional view of the inductor shown in FIG. 1 in a modified example (embodiment in which one inner diameter direction oriented region is included).

In the embodiment shown in FIG. 2, the inductor 1 includes two inner diameter direction oriented regions 14 and two side portions 9. However, the numbers of these are not limited, and for example, as shown in FIG. 6, the inductor 1 may include four inner diameter direction oriented regions 14 and four side portions 9. Furthermore, as shown in FIG. 7, for example, the inductor 1 may include one inner diameter direction oriented region 14 and one side portion 9.

The inductor 1 shown in FIG. 6 can be produced by, for example, disposing the four anisotropic magnetic sheets 20 on the wire 2 from four directions. The inductor 1 shown in FIG. 7 can be produced by disposing one anisotropic magnetic sheet 20 so as to wind the anisotropic magnetic sheet 20 around the wire 2.

Figure 8:
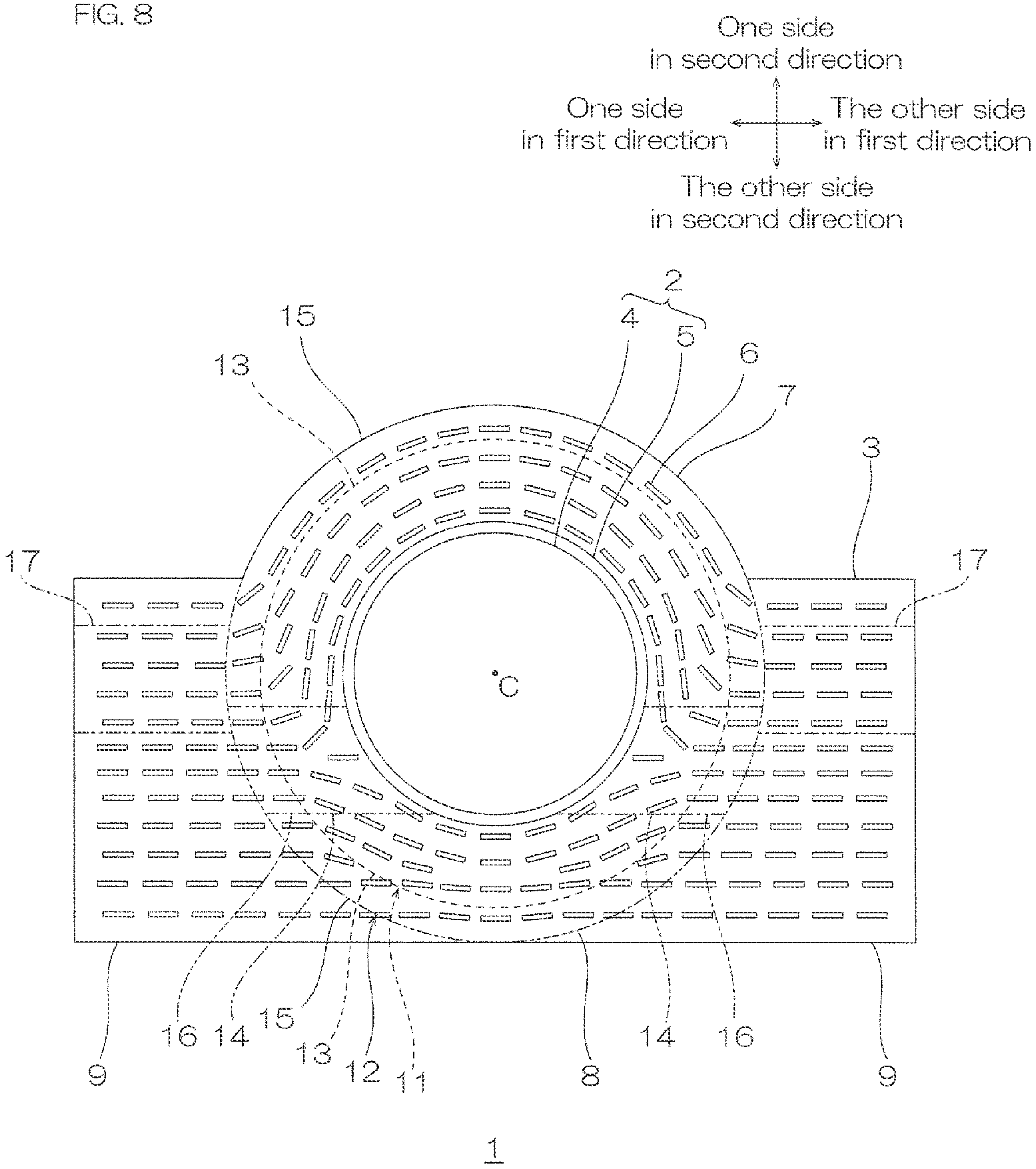
FIG. 8 shows a cross-sectional view of the inductor shown in FIG. 1 in a modified example (embodiment in which the center is not located between the two inner diameter direction oriented regions).

In the embodiment shown in FIG. 2, the center point C of the wire 2 is positioned between the inner diameter direction oriented region 14 at one side and the inner diameter direction oriented region 14 at the other side, but for example, as shown in FIG. 8, the center point C of the wire 2 does not have to be positioned between the inner diameter direction oriented region 14 at one side and the inner diameter direction oriented region 14 at the other side.

The inductor 1 shown in FIG. 1 has a substantially loop shape in plan view, but the shape is not limited, and the extension of the axis direction can be determined depending on purpose and use.

Second Embodiment

Figure 9:
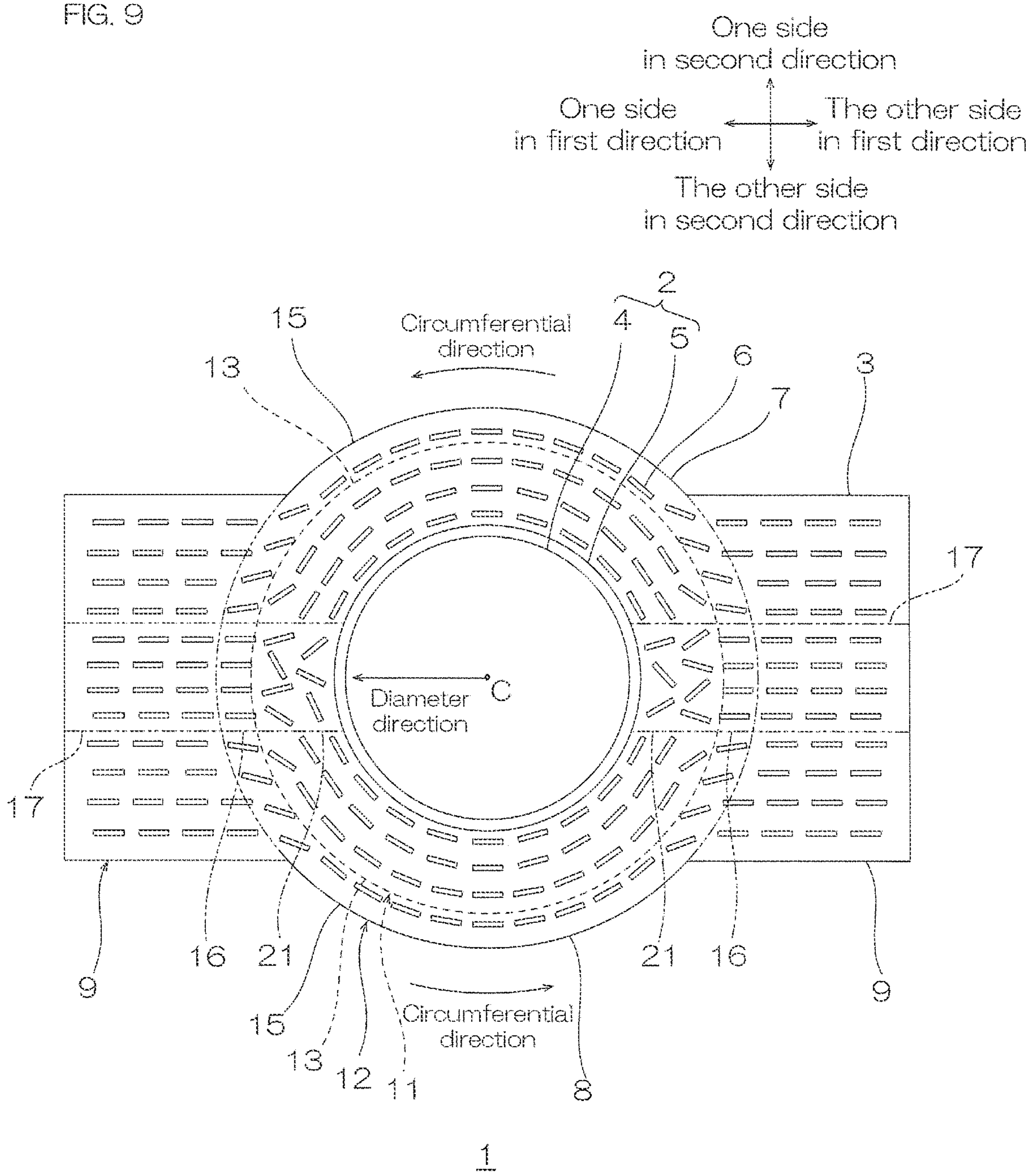
FIG. 9 shows a cross-sectional view of the inductor of the present invention in a second embodiment.

With reference to FIG. 9, the inductor of the present invention in a second embodiment is described. In the modified example, those members that are the same as in the above-described first embodiment are given the same reference numerals, and descriptions thereof are omitted.

In the inductor 1 of the second embodiment, the surrounding region 11 integrally has a plurality of inner circumferentially oriented regions 13 (an example of first region) and a plurality of inner non-oriented regions 21 (an example of second region).

In the inner non-oriented region 21, the anisotropic magnetic particles 6 are not oriented in cross section. That is, the plurality of anisotropic magnetic particles 6 are disposed so that the direction (for example, with flat anisotropic magnetic particles, surface direction of particles) with high relative permeability of the anisotropic magnetic particles 6 are irregular.

The plurality of inner non-oriented regions 21 are disposed to face each other in spaced apart relation at the one side in the first direction of the wire 2 and the other side in the first direction of the wire 2 so as to sandwich the wire 2. To be specific, the center point C of the wire 2 is positioned between the inner non-oriented region 21 at one side and the inner non-oriented region 21 at the other side.

The ratio of the area of the plurality of inner non-oriented regions 21 relative to the entire surrounding region 11 is 10% or more, preferably 20% or more, and for example, 50% or less, preferably 40% or less.

In the inner non-oriented regions 21, the filling rate of the anisotropic magnetic particles 6 is, for example, 40 volume % or more, preferably 50 volume % or more, and for example, 90% by volume or less, preferably 70% by volume or less. When the filling rate is in the above-described range, it has excellent inductance.

The inductor 1 of the second embodiment also has the same operations and effects of the first embodiment.

In view of higher inductance, preferably, the first embodiment is used.

The modified example of the first embodiment can also be applied to the second embodiment.

Third Embodiment

Figure 10:
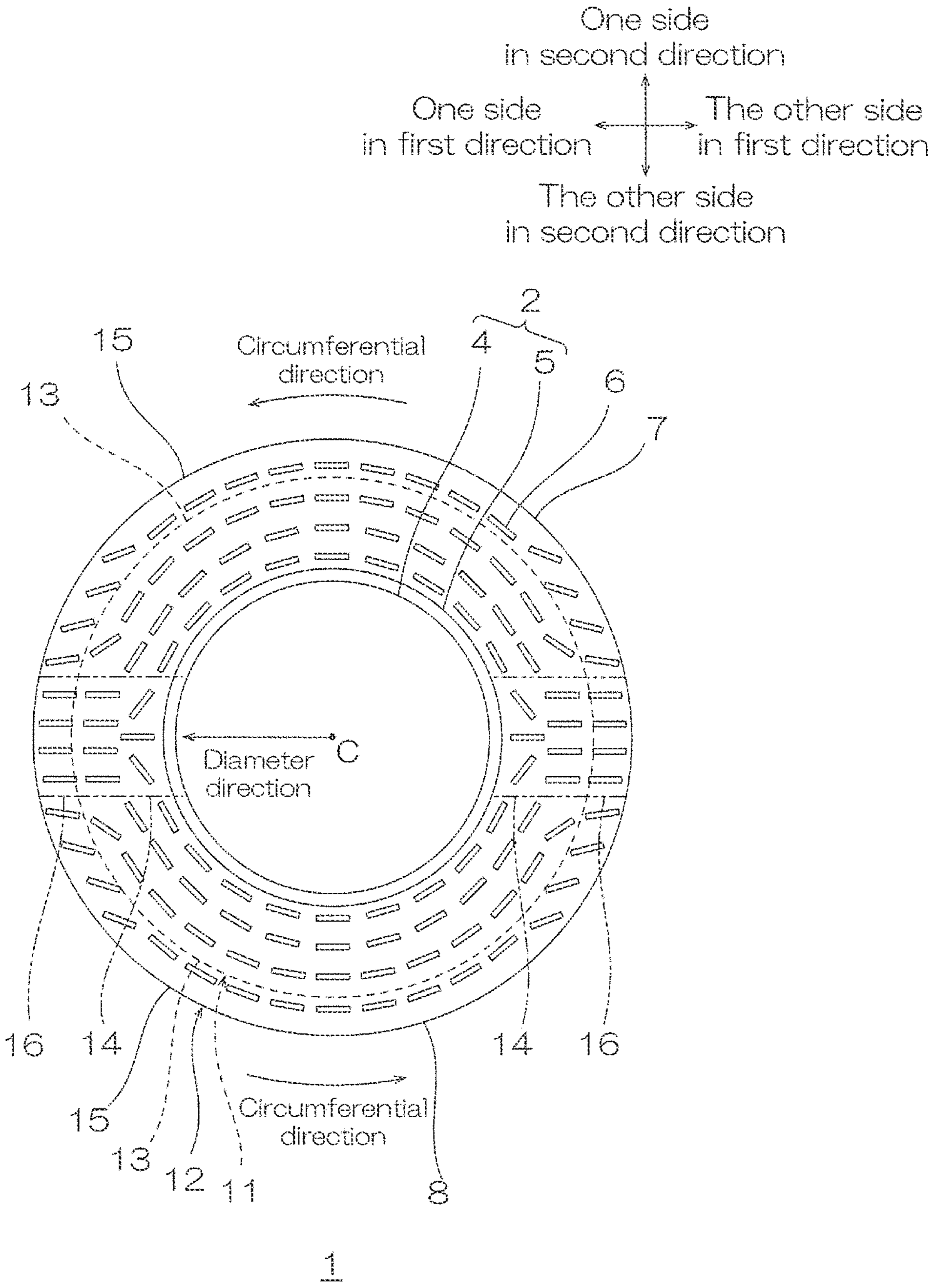
FIG. 10 shows a perspective view of the inductor of the present invention in a third embodiment.

With reference to FIG. 10, the inductor of the present invention in a third embodiment is described. In the modified example, those members that are the same as those in the above-described first embodiment are given the same reference numerals, and descriptions thereof are omitted.

The inductor 1 of the third embodiment does not include a plurality of side portions 9. That is, the magnetic layer 3 is composed only of the main portion 8.

The inductor 1 of the third embodiment also has the same operations and effects as in the first embodiment.

In view of further improving the inductance, preferably, the first embodiment is used.

The modified example of the third embodiment can also be applied to the first embodiment as well. In the third embodiment, the inner diameter direction oriented region 14 can also be made as the inner non-oriented region 21 similarly to the second embodiment.

<Simulation Results>

Example 1

Figure 11:
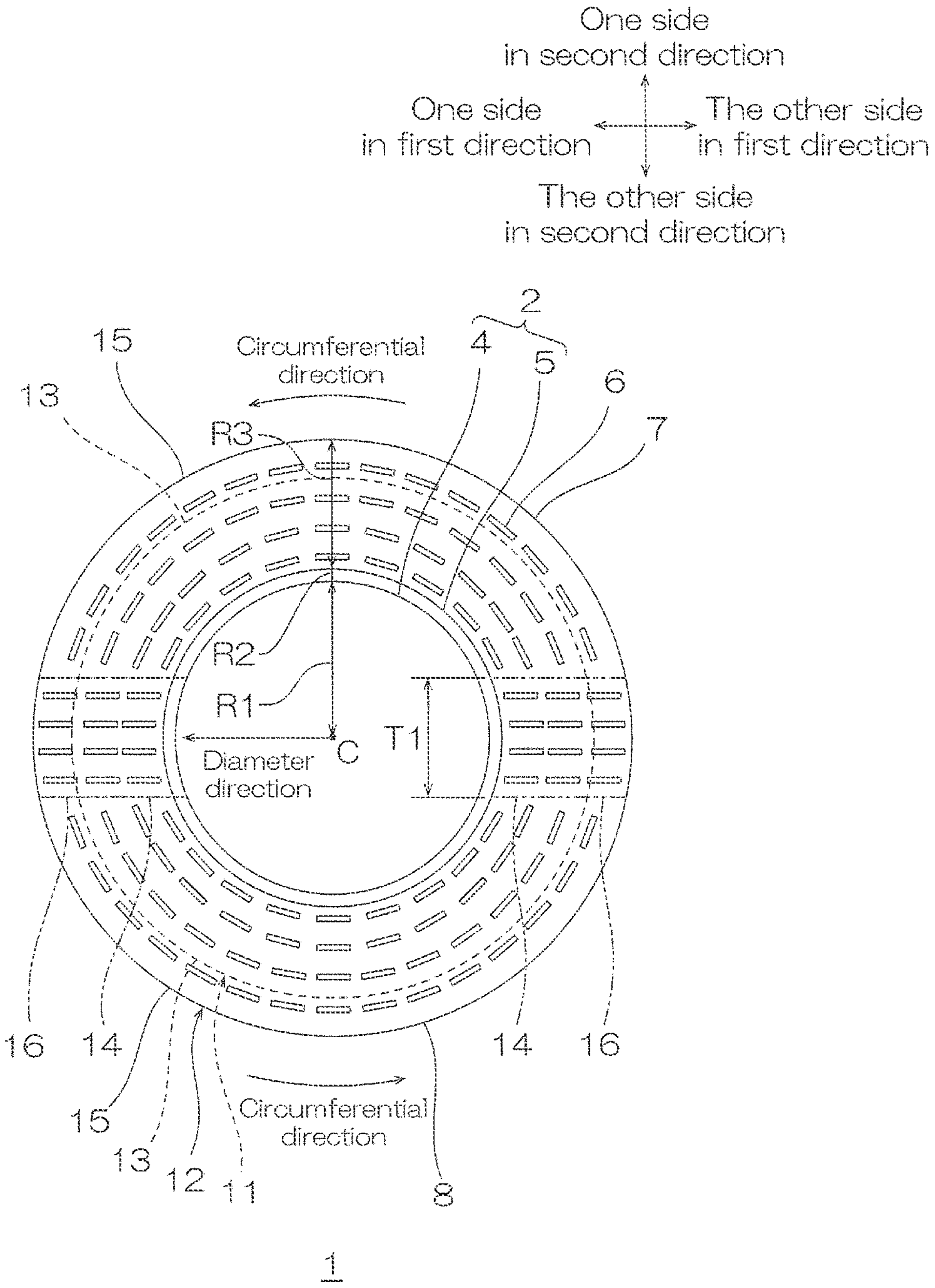
FIG. 11 shows a model of the inductor used for simulation in Examples 1 to 5.

In the model shown in FIG. 11, the inductance and superimposed DC current characteristics of the inductor are calculated by simulation with the following conditions.

Software: [Maxwell 3D] produced by ANSYS, axis direction length of conductive wire 4: 10 mm, radius $R_1$ of conductive wire 4: 110 μm, thickness $R_2$ of insulating layer 5: 5 μm, thickness $R_3$ of main portion 8 of magnetic layer 3: 100 μm, second direction length (thickness) T1 of inner diameter direction oriented region 14: 50 μm, relative permeability μ of the flat anisotropic magnetic particles 6 in the direction along the surface direction in each of the region: 140, relative permeability μ of the flat anisotropic magnetic particles 6 along the direction of the thickness direction in each of the region: 10, frequency: 10 MHz For the superimposed DC current characteristics, changes in magnetic characteristics B relative to the external magnetic strength H were set. For the surface direction, a nonlinear (mode in which B is saturated gradually as the external magnetic strength H increase) setting was used, and for the thickness direction, a linear setting (mode B is constant and not saturated relative to external magnetic strength H) was made.

The inductance value relative to the DC magnetic field was calculated while applying a direct current to the wire.

Sweeping was conducted with the electric current value of 0.1 A to 100 A. At this time, setting the inductance value when the direct current is 0.1 A as the base (100%), the direct current value when it is reduced to 70% was calculated as the superimposed DC current value. The results are shown in Table 1.

Examples 2 to 5

The inductance value and the superimposed DC current value were calculated in the same manner as in Example 1, except that the thickness $T_1$ of the inner diameter direction oriented region 14 was changed to the thickness described in Table 1. The results are shown in Table 1.

Comparative Example 1

The inductance value and the superimposed DC current value were calculated in the same manner as in Example 1, except that the thickness $T_1$ of the inner diameter direction oriented region 14 was changed to 0 m. The results are shown in Table 1.

Example 6

Figure 12:
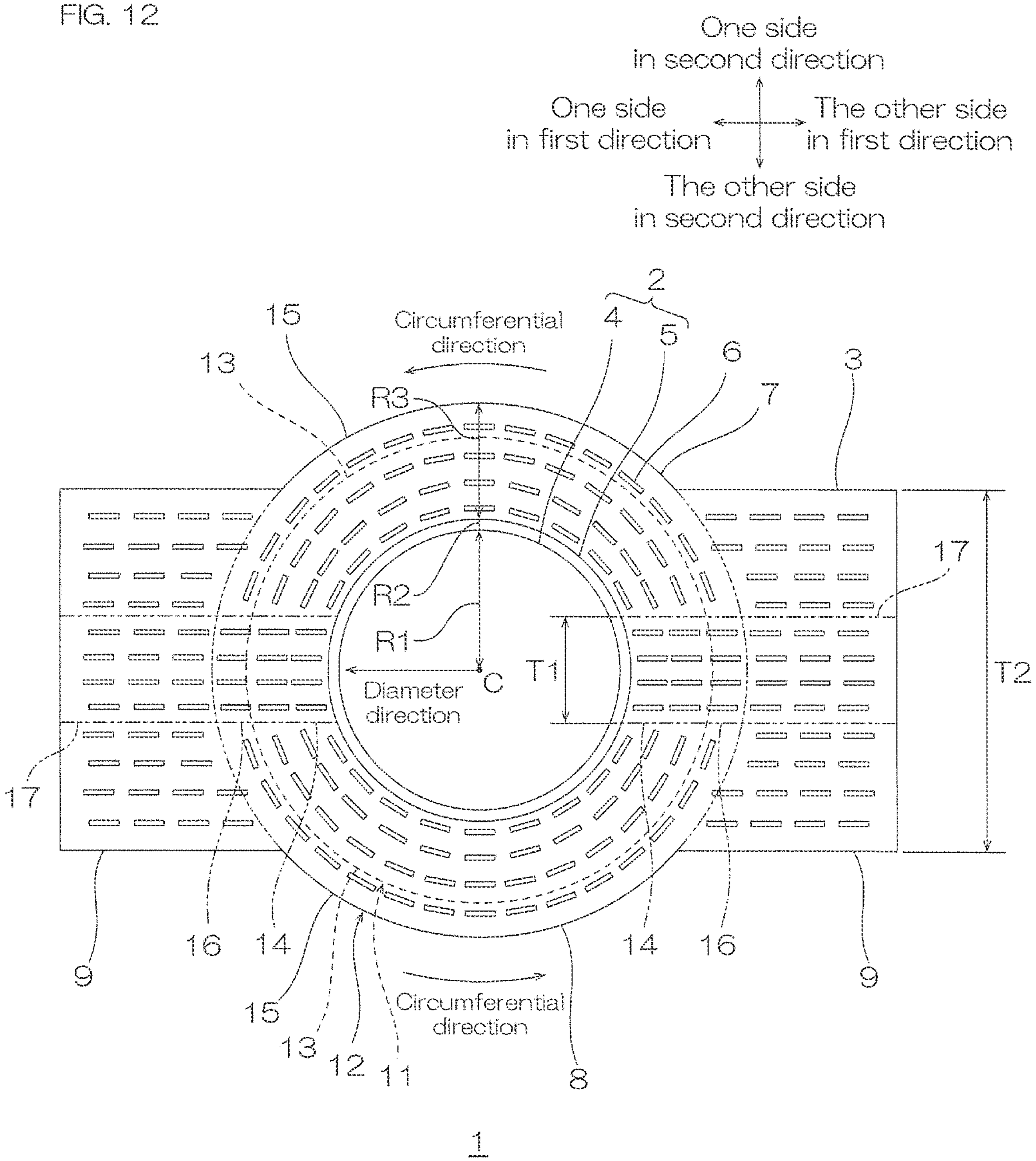
FIG. 12 shows a model of the inductor used for simulation in Examples 6 to 8.

The inductance and superimposed DC current characteristics of the linear inductor shown in FIG. 12 were calculated by simulation.

To be specific, simulation was carried out with the same setting as in Example 1, except that length W of the side portion 9 was set to 50 μm, and the second direction length (thickness) $T_2$ of the side portion 9 was set to 300 μm. The results are shown in Table 2.

Examples 7 to 8

The inductance value and the superimposed DC current value were calculated in the same manner as in Example 6, except that length W of the side portion 9 was changed to the length described in Table 2. The results are shown in Table 2.

Comparative Examples 2 to 4

The inductance value and the superimposed DC current value were calculated in the same manner as in Example 6, except that the thickness $T_1$ of the inner diameter direction oriented region 14 was changed to 0 m, and length W of the side portion 9 was changed to the length described in Table 2. The results are shown in Table 2.

Example 9

Figure 13:
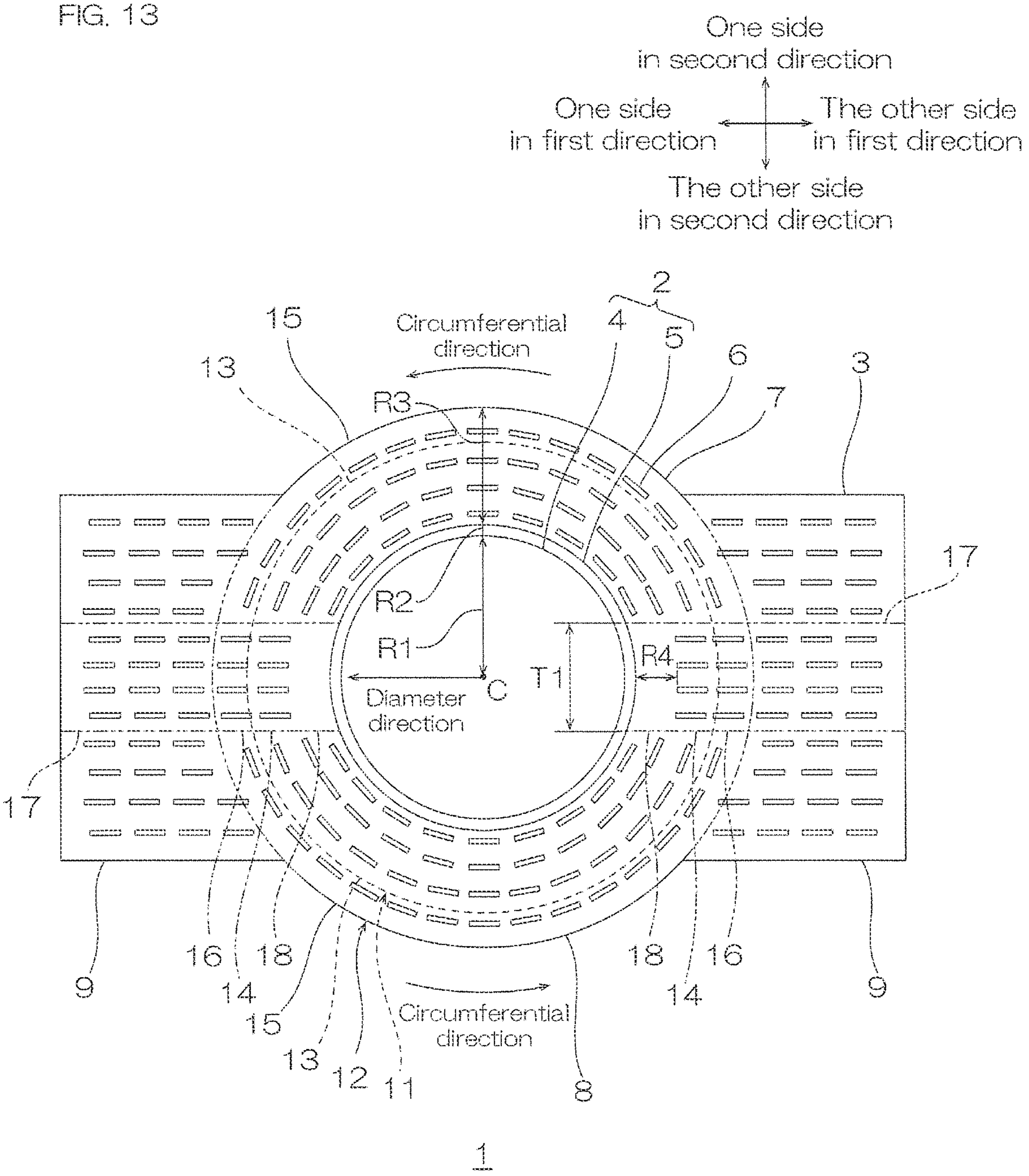
FIG. 13 shows a model of the inductor used for simulation in Examples 9 to 11.

The inductance and superimposed DC current characteristics of the linear inductor shown in FIG. 13 were calculated by simulation.

To be specific, the inductance value and the superimposed DC current value were calculated in the same manner as in Example 1, except that the region from the inner edge of the inner diameter direction oriented region 14 to 22.5 μm in Example 1 was set as the non-charged region 18 (anisotropic region with no anisotropic magnetic particles 6 contained and relative permeability μ of 1). The results are shown in Table 3.

Examples 10 to 11

The inductance value and the superimposed DC current value were calculated in the same manner as in Example 9, except that length $R_4$ of the non-charged region 18 was changed to the distance shown in Table 3. The results are shown in Table 3.

Comparative Example 5

The inductance value and the superimposed DC current value were calculated in the same manner as in Example 9, except that length $R_4$ of the particles non-charged region was changed to 100 μm, that is, the conditions were changed so that the inner diameter direction oriented region 14 contained no anisotropic magnetic particles 6 at all. The results are shown in Table 3.

TABLE 1

| | Example 1 | Example 2 | Example 3 | Example 4 | Example 5 | Comparative Example 1 |
|---|---|---|---|---|---|---|
| Model | FIG. 11 | FIG. 11 | FIG. 11 | FIG. 11 | FIG. 11 | FIG. 11 |
| T1 (μm) | 50 | 5 | 10 | 20 | 80 | 0 |
| W (μm) | 0 | 0 | 0 | 0 | 0 | 0 |
| Inductance (nH) | 83 | 161 | 144 | 121 | 65 | 181 |
| Superimposed DC current value(A) | 4.5 | 1.3 | 1.5 | 2.2 | 7 | 0.9 |

TABLE 2

| | Example 6 | Example 7 | Example 8 | Comparative Example 2 | Comparative Example 3 | Comparative Example 4 |
|---|---|---|---|---|---|---|
| Model | FIG. 12 | FIG. 12 | FIG. 12 | FIG. 12 | FIG. 12 | FIG. 12 |
| T1 (μm) | 50 | 50 | 50 | 0 | 0 | 0 |
| W (μm) | 50 | 100 | 300 | 50 | 100 | 300 |
| Inductance (nH) | 96 | 102 | 113 | 183 | 185 | 190 |
| DC current value(A) | 4.5 | 5 | 5 | 0.9 | 1.0 | 1.2 |

TABLE 3

| Model | Example 1 FIG. 11 | Example 9 FIG. 13 | Example 10 FIG. 13 | Example 11 FIG. 13 | Comparative Example 5 FIG. 13 |
|---|---|---|---|---|---|
| T1(μm) | 50 | 50 | 50 | 50 | 50 |
| W(μm) | 0 | 0 | 0 | 0 | 0 |
| R4(μm) | 0 | 22.5 | 35 | 50 | 100 |
| Inductance (nH) | 83 | 71 | 63 | 54 | 22 |
| DC current value(A) | 4.5 | 6 | 7 | 8 | 30 |

While the illustrative embodiments of the present invention are provided in the above description, such is for illustrative purpose only and it is not to be construed as limiting in any manner Modification and variation of the present invention that will be obvious to those skilled in the art is to be covered by the following claims.

INDUSTRIAL APPLICABILITY

The inductor is incorporated in an electronic device.

DESCRIPTION OF REFERENCE NUMERALS

1 inductor
2 wire
3 magnetic layer
4 conductive wire
5 insulating layer
6 anisotropic magnetic particles
11 surrounding region
13 inner circumferentially oriented region
14 inner diameter direction oriented region
17 side portion oriented region
21 inner non-oriented region

The invention claimed is:

1. An inductor comprising:

a wire having a substantially circular shape in cross section, and a magnetic layer covering the wire, wherein the wire includes a conductive wire and an insulating layer covering the conductive wire, the magnetic layer contains anisotropic magnetic particles and a binder, and includes in a surrounding region of the wire within 1.5 times the radius of the wire, a first region in which the anisotropic magnetic particles are oriented along the circumferential direction of the wire, and a second region in which the anisotropic magnetic particles are oriented along the crossing direction that crosses the circumferential direction, or in which the anisotropic magnetic particles are not oriented.

2. The inductor according to claim 1, including a plurality of the second regions.

3. The inductor according to claim 1, wherein the second region is a region in which the anisotropic magnetic particles are oriented along the diameter direction of the wire.

4. The inductor according to claim 3, wherein in the second region, the filling rate of the anisotropic magnetic particles is 40 volume % or more.

5. The inductor according to claim 1, wherein the magnetic layer includes a third region, in which the anisotropic magnetic particles are oriented along the diameter direction of the wire in an outside of the surrounding region.

* * * * *